United States Patent [19]
Londrigan et al.

[11] Patent Number: 5,837,743
[45] Date of Patent: Nov. 17, 1998

[54] METHOD FOR PRODUCING FOAMS FROM HIGH ACID POLYESTER POLYOLS

[75] Inventors: Michael Edward Londrigan, Clearwater; Judy Ann Godbey, Tampa; Gregory W. Lynn, Clearwater, all of Fla.

[73] Assignee: Celotex Corporation, Tampa, Fla.

[21] Appl. No.: 58,140

[22] Filed: Apr. 10, 1998

Related U.S. Application Data

[62] Division of Ser. No. 873,435, Jun. 12, 1997.

[51] Int. Cl.$^6$ .................................................. G08G 18/42
[52] U.S. Cl. .......................... 521/172; 264/175; 521/173
[58] Field of Search ................................. 521/172, 173; 264/175

[56] References Cited

U.S. PATENT DOCUMENTS

| | | | |
|---|---|---|---|
| 3,032,517 | 5/1962 | Dombrow et al. | 260/2.5 |
| 4,028,158 | 6/1977 | Hipchen et al. | 156/79 |
| 4,411,949 | 10/1983 | Snider et al. | 428/304.4 |
| 4,710,521 | 12/1987 | Soukup et al. | 521/118 |
| 4,711,912 | 12/1987 | Snider et al. | 521/125 |
| 4,927,863 | 5/1990 | Bartlett et al. | 521/131 |
| 5,124,366 | 6/1992 | Gluck et al. | 521/99 |
| 5,149,722 | 9/1992 | Soukup | 521/99 |
| 5,252,625 | 10/1993 | McLaughlin et al. | 521/125 |
| 5,254,600 | 10/1993 | Blanpied et al. | 521/125 |
| 5,312,848 | 5/1994 | Klapper et al. | 521/172 |
| 5,405,884 | 4/1995 | Londrigan et al. | 521/125 |
| 5,563,180 | 10/1996 | Skowronski et al. | 521/125 |

OTHER PUBLICATIONS

Kennedy, E.E. et al., "Evaluations of HCEC–123 and HCEC–141b as Potential Blowing Agents for Polyurethane/Polyisocyanurate Rigid Foam Laminate Insulation", Polyurethanes 88, pp. 153–158, Pub. 1988.

Lund, E.A.E. et al., "A Performance Evaluation of Environmentally Acceptable Foam Blowing Agents", Polyurethanes 88, pp. 290–296, Pub. 1988.

Oxid Product Information Bulletin, Terol™ Polyester Polyols Pub. Jun., 1992.

*Primary Examiner*—Morton Foelak
*Attorney, Agent, or Firm*—Charles W. Vanecek

[57] ABSTRACT

Closed cell, rigid polymer foams are prepared by (a) continuously conveying a carrier along a production line, (b) supplying on the carrier a foam-forming mixture comprising a polyisocyanate, a catalyst, a hydrogen-containing blowing agent or a mixture of the hydrogen-containing blowing agent and at least one co-blowing agent, and an isocyanate-reactive component comprising (i) a high acid polyester polyol having an acid number greater than 1, or (ii) a mixture of the high acid polyester polyol and at least one other isocyanate-reactive compound, (c) passing the carrier and mixture between two constricting members forming therebetween a metering gap, and (d) allowing the mixture after passing through the gap to freely expand to form a plastic foam, wherein the acid number and amount of the high acid polyester polyol in the mixture are sufficiently high to result in a superior resistance to cold temperature shrinkage.

18 Claims, 2 Drawing Sheets

METHOD FOR PRODUCING FOAMS FROM HIGH ACID POLYESTER POLYOLS

This is a division of application Ser. No. 08/873,435 allowed, filed Jun. 12, 1997.

BACKGROUND OF THE INVENTION

1. Field of the Invention

This invention relates to the manufacture of plastic foam products, and particularly to a method for imparting a uniform thickness, and superior dimensional stability to the products on a continuous manufacturing line.

2. Description of the Prior Art

Methods for the continuous production of a rigid insulating polymeric foam board comprising a foam layer sandwiched between facing materials are well known. Such boards are typically used in the construction of walls, ceilings, roofs and the like. In the production, a foam-forming mixture is customarily delivered between two continuous webs of sheet material which are transported through various processing stations.

In order to avoid a substantial waste of material and provide uniformly thick and aesthetically appealing foam boards, it is highly desirable that the boards be produced with a substantially rectangular cross-section, and without a round top or other nonuniformity in the boards' dimensions. Heretofore a commonly practiced method for controlling the caliper or thickness of the boards has been the so-called "restrained rise" type. Here the foamable material and facers are directed between flatness-promoting confining means, such as a pair of spaced conveyor belts, which suitably are positioned apart a distance less than the thickness the combination of foam and facers would otherwise reach if allowed to expand unrestrictedly.

Another conventional method for continuously producing plastic foams is the "free rise" type, such as disclosed in U.S. Pat. No. 4,028,158, wherein the thickness of the finished foam board is controlled by passing the foamable mixture and facers through a metered gap which is preferably provided by the nip of two rotating rolls. Although this metering means avoids the time-consuming and cumbersome operation involved in using the conveyors of the restrained rise system, the caliper variation in the cross direction of foam boards produced on free rise lines, especially the thicker boards, turns out to be considerably greater than that of "restrained rise" boards.

A further difficulty which has been encountered with currently manufactured foam boards is their tendency to shrink after production. The problem stems from the replacement of the conventional chlorofluorocarbons with alternative blowing agents which have a low ozone depletion potential but can cause foam cell shrinkage. In this regard, it has been found that certain closed-cell polyisocyanurate foams made with a hydrochlorofluorocarbon such as HCFC-141b shrink at low temperatures.

It would be highly desirable if a method could be found for producing, with the alternative blowing agents, foam boards having a high degree of uniformity in surface flatness combined with the other properties desired in such boards, such as superior shrinkage-resistance, without sacrificing the speed and efficiency which characterize free rise foam production lines.

OBJECTS OF THE INVENTION

It is accordingly an object of the invention to provide a rigid or flexible plastic foam having an especially flat surface, an appealing appearance, and a combination of other good properties, and an improved method for producing the foam.

It is another object of the invention to produce closed cell, rigid foams, particularly polyurethane and polyisocyanurate foams, which have a highly uniform thickness and overall good properties, including superior shrinkage-resistance, particularly at low temperatures, excellent thermal insulative properties, low friability, high strength and thermal resistance, and good dimensional stability.

It is still another object of the invention to provide a continuous method for producing plastic foam in free rise foam manufacture and thereby regulating the thickness of the resultant foams while economizing on material usage.

It is a further object of the invention to provide closed cell foam materials which can be used in building panels which are highly insulating, thermally resistant, dimensionally stable, and low in friability, and have good facing sheet adhesion.

It is yet another object of the invention to provide a method of producing foams having exceptional physical properties although the conventional fully halogenated chlorofluorocarbons are excluded as blowing agents during the production.

It is a still further object of the invention to provide uniformly thick foam boards which are well suited for constructional installations, such as for fitting in edge moldings and being taped at the seam of two boards.

SUMMARY OF THE INVENTION

The foregoing and other objects have been achieved and the drawbacks of the prior art have been overcome by the use of a polyester polyol having a high acid number in the production of plastic foams. Applicants have discovered that such a polyester polyol is particularly useful in the production of rigid plastic foams comprising isocyanate-based foam compositions, such as polyurethanes and polyisocyanurates, which are blown with hydrogen-containing alternatives in place of the conventional chlorofluorocarbon blowing agents. The resultant foams are characterized by exceptional physical properties, especially superior shrinkage resistance, strength, and insulating efficiency, more uniform surface flatness and improved facer adhesion. The polyester polyol of the invention suitably has an acid number which is in excess of 1.0, and advantageously is at least equal to about 1.5. The high acid polyester polyol may be used either alone or in combination with at least one other isocyanate-reactive component, such as a glycol.

The improved foams of the invention are suitably prepared from reactants comprising a polyisocyanate and the high acid polyester polyol, which are brought together in the presence of a catalyst and a hydrogen atom-containing blowing agent. Advantageously, no fully halogenated chlorofluorocarbon is employed as a blowing agent of the invention. The foaming reaction may be carried out in the presence of auxiliaries and additives as required (e.g., a surfactant).

The polyisocyanate component can be any of the polyisocyanates known to be useful in the art of polymer formation. A preferred group of polyisocyanates are the aromatic polyisocyanates, especially methylene-bridged polyphenyl polyisocyanate mixtures. The polyester polyol component, which preferably is an aromatic compound, can be prepared from either substantially pure reactants or various side-stream, waste or scrap residues, or from combinations of the two. In any event, the synthesis is conducted using techniques known to those skilled in the art to yield a polyester polyol having the desired high acidity. Alternatively, a polyester polyol whose acid number would otherwise be too low for the purposes of this invention can be converted to a usable form by reaction with a conventional acidifying agent.

In accordance with the continuous process of the present invention, a mixture of the high acid polyester polyol and the other foam-forming ingredients is applied from a dispenser to a carrier being conveyed along a continuous foam production line, and a metering device located upstream of the dispenser is employed for metering the mixture and uniformly distributing it on the carrier, which may be a flexible or rigid material. Another moving material is suitably placed over the deposited mixture so that the finished product will advantageously have a plastic foam core sandwiched between the upper and lower facing materials or sheets. The apparatus includes a conveyor assembly for continuously advancing the facing materials, either or both of the latter materials being optionally removable to yield a foam which is partially or completely unfaced.

The metering device advantageously comprises two spaced opposed members forming therebetween a metering nip or gap and capable of constricting a liquid mixture passed through the gap. At least one member of the device is advantageously adjustable toward and away from the other to vary the nip gap. Various shapes and materials of construction, e.g., rolls, bars or plates made of metal or other materials, may be used in the makeup of the constricting members of the metering device. Advantageously, the upper member of the metering device is a cylindrical roller, and generally both the upper and lower members are cylindrical rollers.

After the foamable mixture is deposited and suitably enclosed between the continuously advancing carrier and covering sheets, the composite of the deposited mixture and enclosing sheets is passed through the gap provided by the nip of the metering device. The device, which comprises, for example, two closely spaced parallel rollers located one above the other, causes the sheets to converge into proximate relationship with the foamable mixture sandwiched between them. The upper sheet advantageously passes around the upper roller which is maintained at a regulated distance from the lower roller so that the rollers serve as a thickness controlling means for the foam-forming mixture.

After passing through the gap defined by the metering means, the foam-forming mixture advances into an expansion zone wherein the mixture expands to the cured state. In the expansion zone, the foam-forming mixture is allowed to expand freely without constraint by a leveling member such as the upper conveyor disclosed in U.S. Pat. No. 4,572,865. Despite this absence of the restraining member, the usual board crowning encountered in "free rise" foaming is avoided due to the presence of the high acid polyester polyol in the foam-forming composition. Curing can be facilitated through the application of heat which may be controllably added by the circulation of hot air. The finished foam structure may then be periodically severed into finite lengths for commercial use. While the process of the invention is particularly useful in the production of foam boards having a rigid plastic foam core, flexible foams are also producible thereby. Of special interest are polyurethane and polyisocyanurate foam cores.

BRIEF DESCRIPTION OF THE DRAWINGS

The invention will now be described with reference to the accompanying drawings in which.

DETAILED DESCRIPTION OF THE INVENTION

Figure 1:
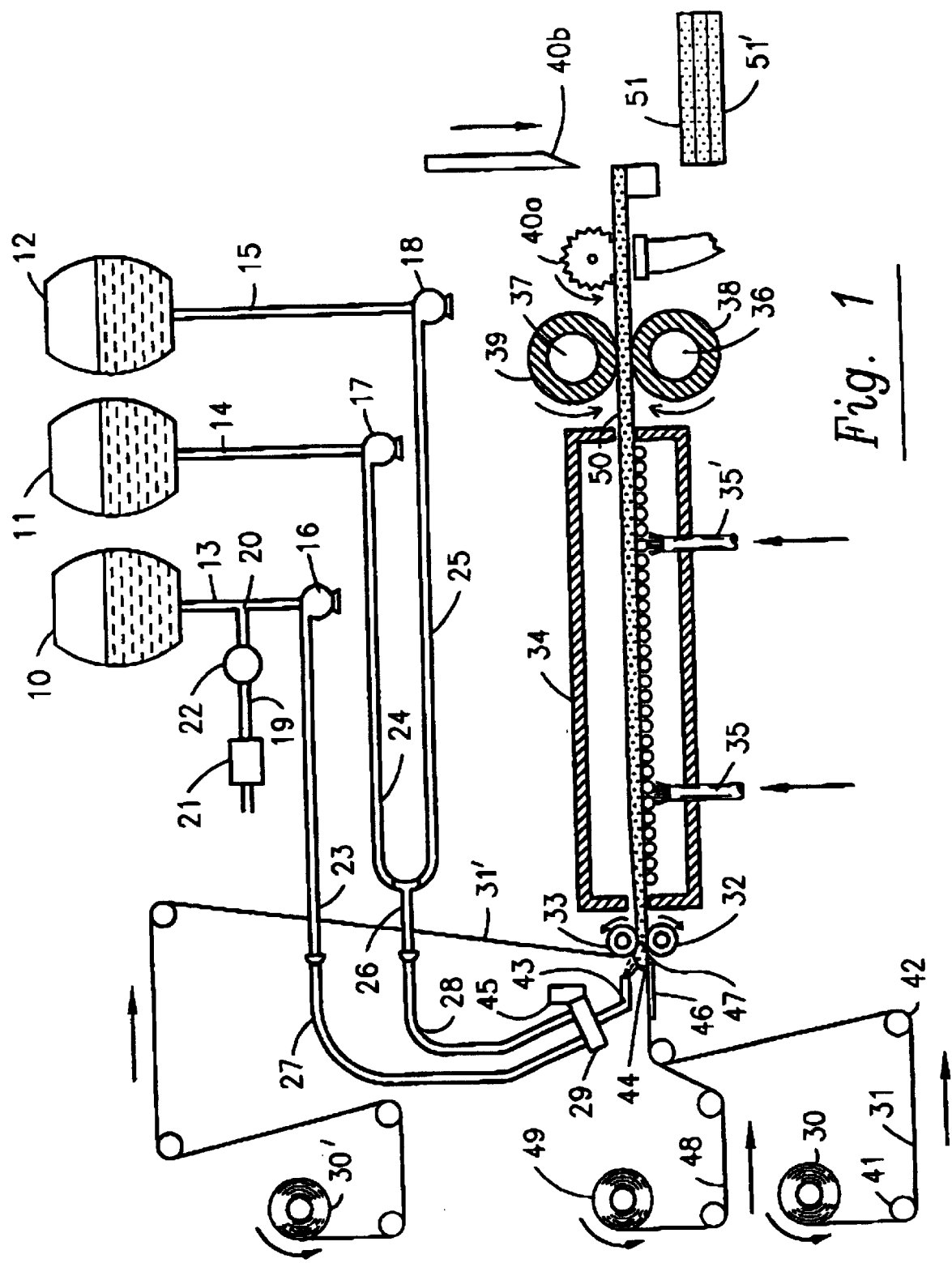
FIG. 1 is a schematic elevation of an apparatus suitable for practicing the free-rise process of the invention.

As described hereinabove, in one aspect this invention relates to the discovery that a polyester polyol with a high acidity has an exceptional capacity to enhance the shrinkage resistance of cellular foams, particularly of urethane and isocyanurate foams. The high acid polyester polyols can be produced by reacting together a polycarboxylic acid and/or acid derivative (e.g., anhydride or ester) with a polyol, which preferably comprises at least one glycol compound, until the acid number of the resultant polyester polyol is determined to be within the suitably high range, e.g., about 1.5 to 10. Already formed polyester polyols with an unacceptably low acid number are readily transformable into high acid polyols of the invention through a simple acidification.

Formation of the high acid polyesterols is conveniently effected by admixing the acid(s) and/or derivative(s) thereof with the polyol or polyols, which are preferably in excess of the quantity to be reacted, and establishing and maintaining the resulting mixture in an elevated temperature range for a period of time sufficient for complete reaction. Generally, enough esterification or transesterification catalyst is added to the reaction mixture to suitably promote the reaction. Any conventional catalyst (single compound or mixture of compounds), such as organotin compounds, other metal catalysts, e.g., tetraisopropyl titanates, and the like, can be used. While the polyester polyols can be prepared from substantially pure reactant materials, more complex ingredients can also be used, such as the side-stream, waste or scrap residues from the manufacture of phthalic acid, terephthalic acid, dimethyl terephthalate, polyethylene terephthalate, adipic acid and the like, or suitable polyol side-stream sources.

Reactions with alkylene oxides also may be employed in the formation of the high acid polyols of the invention. These reactions desirably are catalyzed. The temperature of the process should be from about 80° to 200° C., and the pressure should generally range from about 1 to 40 atmospheres.

The polycarboxylic acid component, which is preferably dibasic, may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid and tall oil fatty acids; terephthalic acid dimethyl ester and terephthalic acid-bis glycol ester.

Particularly suitable polyester polyols of the invention are aromatic polyester polyols containing phthalic acid residues.

Such residues advantageously comprise at least about 30% by weight of the acid component used to produce the polyols. By phthalic acid residue is meant the group

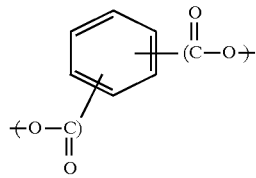

Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyol component, e.g., glycol or glycol mixtures, to polyester polyols through conventional esterification or transesterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalate, especially polyethylene terephthalate (PET), residues or scraps and byproduct terephthalic acid streams.

Still other preferred residues are DMT process residues, which are produced from the manufacture of dimethyl terephthalate (DMT). During the manufacture of DMT in which p-xylene is converted through oxidation and esterification with methanol, the desired product is obtained in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the final residue from the system.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate®101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, 4,714,717, and 4,897,429, the disclosures of which with respect to the residues are hereby incorporated by reference.

A preferred polyol component for reaction with the polycarboxylic acid component is a glycol. The glycols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

HO—R—OH wherein R is a divalent radical selected from the group consisting of:
(a) alkylene radicals containing from 2 through 6 carbon atoms, and
(b) radicals of the formula:

$$—(R^1O)_m—R^1—$$

wherein $R^1$ is an alkylene radical containing from 2 through 6 carbon atoms, and m is an integer of from 1 through 4, and
(c) mixtures thereof.

Besides the glycols, any suitable polyhydric alcohol may be used in preparing the polyester polyols. These additional polyols can be aliphatic, cycloaliphatic, aromatic and/or heterocyclic, and are preferably diols, but can include triols and tetrols. These polyols optionally may include substituents which are inert in the reaction, for example, chlorine and bromine substituents, and/or may be unsaturated. Suitable amino alcohols, such as, for example, monoethanolamine, diethanolamine, triethanolamine, or the like, may also be used.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bishydroxymethylcyclohexane).

The term "polyester polyol" is used in this specification and claims in the conventional sense and includes any unreacted alcohol (e.g., glycol) used in and remaining after the preparation of the polyester polyol and/or such alcohol added after the preparation. The unreacted glycol is commonly called "free glycol".

The high acid polyester polyols of the invention suitably contain on the average per molecule at least 1.8 hydroxyl groups, and generally have an average equivalent weight of from about 150 to 350 and an acid number of from about 1.5 to 5.0. Advantageously, these polyester polyols contain on the average per molecule from about 1.8 to 2.4 hydroxyl groups, and have an average equivalent weight of from about 175 to 300, preferably from about 200 to 300, and an acid number of from about 1.5 to 2.0. The viscosities (Brookfield) of the polyester polyols measured in cps at 25° C. may vary broadly, e.g., from about 1,000 to 20,000 and above.

In an advantageous embodiment of the invention, the high acid polyester polyols are employed in admixture with at least one other isocyanate-reactive component (e.g., other polyol) in the production of the foam compositions, especially the polyurethane foams. Polyols which can be employed in such admixtures include monomeric polyols and polyether polyols. Suitable polyether polyols are the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2–8, and more preferably has a functionality of 3 or greater (e.g., 4–8).

The polymer foams of the present invention can be prepared by using standard techniques known to those skilled in the art. The closed cell, rigid polymer foams of the invention advantageously comprise the reaction product under foam-forming conditions of a polyisocyanate and an isocyanate-reactive component, wherein the isocyanate-reactive component comprises (a) a high acid polyester polyol having an acid number greater than 1, or (b) a mixture of the high acid polyester polyol with at least one other isocyanate-reactive compound, the acid number of the high acid polyester polyol and the amount thereof in the foam being sufficiently high to result in an improved resistance to cold temperature shrinkage. The content of high acid polyester polyol in mixture(b) is generally at least about 20 percent by weight. The high acid polyester polyol typically will reduce significantly a foam's cold temperature shrinkage, vis-a-vis a comparable foam prepared with the conventionally used polyester polyols having the same equivalent weight but a lower acid number.

The preferred polyurethane and polyisocyanurate foams typically can be prepared by mixing together an organic polyisocyanate with the high acid polyol, catalyst and blowing agent at temperatures ranging from about 0° C. to 150° C. In the case of the polyurethanes, the polyol and polyisocyanate are generally reacted on an essentially 1:1 to 1:1.25 equivalent basis. In the embodiment wherein the high acid polyester polyols are combined with another polyol(s) to produce polyurethane foams, the high acid polyester polyols can comprise about 5 to 100, preferably about 40 to 100 and more preferably about 50 to 100, weight percent of the total polyol content in the foam preparations. In the case of the polyisocyanurates, the polyisocyanate is suitably reacted with a minor amount of the polyol, such as sufficient polyol to provide about 0.10 to 0.70 hydroxyl equivalent of polyol per equivalent of polyisocyanate, wherein the high acid polyester polyol comprises about 5 to 100, and preferably about 50 to 100, weight percent of the total polyol content in the foam preparations.

The polyisocyanate component employed in the foam preparation can be any of the polyisocyanates known to be useful in the art of polymer formation. The organic di- or polyisocyanates of the invention include aliphatic, cycloaliphatic, araliphatic, aromatic and heterocyclic polyisocyanates and combinations thereof characterized in having two or more isocyanate (NCO) groups per molecule.

Among the many isocyanates suitable for the practice of the subject invention are, for example, tetramethylene, hexamethylene, octamethylene and decamethylene diisocyanates, and their alkyl substituted homologs, 1,2-, 1,3- and 1,4-cyclohexane diisocyanates, 2,4- and 2,6-methyl-cyclohexane diisocyanates, 4,4'- and 2,4'-dicyclohexyl-diisocyanates, 4,4'- and 2,4'-dicyclohexylmethane diisocyanates, 1,3,5-cyclohexane triisocyanates, saturated (hydrogenated) polymethylenepolyphenylenepolyisocyanates, isocyanatomethylcyclohexaneisocyanates, isocyanatoethyl-cyclohexane isocyanates, bis(isocyanatomethyl)-cyclohexane diisocyanates, 4,4'- and 2,4'-bis (isocyanatomethyl) dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'-diphenylmethane diisocyanates, polymethylenepolyphenylene-polyisocyanates (polymeric MDI), and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylenepolyphenylenepolyisocyanates (polymeric MDI), and mixtures of the above preferred isocyanates. Most particularly preferred are the polymeric MDI's.

Still other useful organic polyisocyanates are isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane oligomers, polyhydric polythioethers, ethylene oxide adducts of phosphorous-containing acids, polyacetals, aliphatic polyols, aliphatic thiols including alkane, alkene and alkyne thiols having two or more SH groups; as well as mixtures thereof. Compounds which contain two or more different groups within the above-defined classes may also be used such as, for example, compounds which contain both an SH group and an OH group. Highly useful quasi-prepolymers are disclosed in U.S. Pat. No. 4,791,148 and U.S. application Ser. No. 07/342,508, filed Apr. 24, 1989, the disclosures of which with respect to the quasi-prepolymers are hereby incorporated by reference.

Any suitable hydrogen atom-containing blowing agent can be employed in the foam compositions of the present invention. These blowing agents, which can be used alone or as mixtures, can be selected from a broad range of materials, including partially halogenated hydrocarbons, ethers and esters, hydrocarbons, esters, ethers, and the like. Among the usable hydrogen-containing blowing agents are the HCFCs such as 1,1-dichloro-1-fluoroethane, 1,1-dichloro-2,2,2-trifluoro-ethane, monochlorodifluoromethane, and 1-chloro-1,1-difluoroethane; the HFCs such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFEs such as methyl-1,1,1-trifluoroethylether and difluoromethyl-1,1,1-trifluoroethylether; and the hydrocarbons such as n-pentane, isopentane, and cyclopentane.

A wide variety of co-blowing agents can be employed in conjunction with the hydrogen-containing agents in preparing the foam compositions of the invention. Water, air, nitrogen, carbon dioxide, readily volatile organic substances and/or compounds which decompose to liberate gases (e.g., azo compounds) may be used. Preferably, the blowing agent of the invention includes no completely halogenated chlorofluorocarbon. Typical co-blowing agents have a boiling point between minus 50° C. and plus 100° C., and preferably between −50° C. and +50° C. In an advantageous embodiment of the invention, water is not used as a blowing agent in the rigid foam-forming compositions.

A preferred method for the production of froth foams of the invention is disclosed in U.S. Pat. No. 4,572,865, whose disclosure is hereby incorporated by reference. In this method, the froth-forming blowing agent can be any material which is inert to the reactive ingredients and easily vaporized at atmospheric pressure. This frothing agent advantageously has an atmospheric boiling point of −50° C. to 10° C. In a desirable embodiment of the invention, a higher boiling blowing agent is used in conjunction with the frothing agent. The former blowing agent advantageously has an atmospheric boiling point ranging from about 10° to 80° C.

The blowing agents are employed in an amount sufficient to give the resultant rigid foam the desired bulk density which is generally between 0.5 and 10, preferably between 1 and 5, and most preferably between 1.5 and 2.5, pounds per cubic foot. The blowing agents generally comprise from 1 to 30, and preferably comprise from 5 to 20 weight percent of the composition. When a blowing agent has a boiling point at or below ambient, it is maintained under pressure until mixed with the other components.

Any of the catalysts conventionally employed in the art to catalyze the reaction of an isocyanate with an isocyanate-reactive compound can be employed in the foam preparations of the invention. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutylin dilaurate, dibutyltin diacetate, stannous octoate, lead octoate, colbalt naphthenate, triethylamine, triethylenediamine, N,N,N',N'-tetramethylethylenediamine, 1,1,3,3-tetramethylguanidine, N,N,N'N'-tetramethyl-1,3-butanediamine,N,N-dimethylethanolamine, N,N-diethylethanolanine, and the like.

In the preparation of the polyisocyanurate rigid foams, any catalyst that will induce reaction of the isocyanate with the polyol and will induce isocyanurate ring formation can be employed in the foam preparations of the invention. Most commonly used trimerization catalysts also function to catalyst the reaction of polyol and isocyanate to form urethane. However, a separate catalyst may, if desired, be used for urethane formation. The trimerization catalysts include metal carboxylates, tertiary amine trimerization catalysts, quaternary ammonium carboxylates, alkali metal alkoxides, alkali metal phenoxides and the like. Representative metal carboxylates are sodium and potassium formates, acetates, and 2-ethylhexanoates. Tertiary amine catalysts include 1,3,5-tris (N,N-dimethylaminopropyl)-s-hexahydrotriazine, o- and p-(dimethylaminomethyl) phenols and 2,4,6-tris(dimethylaminomethyl) phenol and the quaternary ammonium salts include N-hydroxyl-alkyl quaternary ammonium carboxylates and tetramethylammonium formate, acetate,2-ethylhexanoate and the like. Suitable urethane catalysts include, for instance, tertiary amines such as triethyl amine, N,N-dimethylcyclohexylamine, pentamethyldiethylenetriamine and N,N-dimethylethanolamine as well as 1,4-diazabicyclo [2.2.2] octane and organo tin compounds such as dibutyltin diacetate, stannous octoate and dibutyltin dilaurate.

The catalyst or catalyst mixture is used in a catalytically effective amount. Generally, the catalyst comprises from about 0.1 to 20, preferably from about 0.3 to 10, weight percent of the total foam-forming composition.

Inclusion of the high acid polyester polyols in the foam-forming mixtures of the invention greatly improves the mixtures' processibility on free rise production lines and the properties of the resultant foams. In the free rise manufacture of foams from mixtures containing alternative blowing agents and conventional low acid polyester polyols, it has proved difficult heretofore to achieve adequate catalysis. The result has been foam products with poor shrinkage resistance, expecially at low temperatures.

This situation is remedied through use of the high acid polyester polyols of the present invention. They enable more catalyst to be added and a better reaction profile to be obtained on high speed, free rise lines, with the result that a flatter, more dimensionally stable foam is produced. Use of the high acid polyols advantageously results in a firm time/cream time ratio of less than about 4:1, more preferably 2.5:1. The effects are especially pronounced for thick foam products, such as those in the range from about 2–4¼ inches thick. A desirable foam reactivity profile is characterized by a cream time of from about 5 to 40, more preferably 10 to 30, and most preferably 15 to 25, sec.; and a firm time of from about 15 to 90, more preferably 20 to 70, and most preferably 25 to 55, sec.

The effect of the high acid polyols is particularly manifest in the continuous production of faced polyisocyanurate foam boards. A preferred catalyst for the production is an organic acid metal salt which in one embodiment is used in combination with a tertiary amine. In another embodiment, the tertiary amine is omitted. The organic acid metal salt suitably is an alkali metal and/or alkaline earth metal salt(s) of a carboxylic acid, such as one containing from about 1 to 30 carbon atoms. The cation of the organic acid metal salt, which is preferably an alkali metal salt(s), advantageously is K or Na, more preferably K. Preferred are $C_1$–$C_8$ carboxylate salts, including the sodium and potassium salts of formic, acetic, propionic and 2-ethylhexanoic acids. Particularly preferred are the salts of high molecular weight carboxylic acids, such as those containing about 5 to 30, more advantageously 8 to 30, carbon atoms, e.g., potassium 2-ethylhexanoate.

The tertiary amines which can be employed in the catalyst system in accordance with the invention are those which are usually employed to catalyze the reaction between an isocyanate group and an active hydrogen atom. Such catalysts are a group of compounds well recognized in the art of synthesizing polyurethanes; see, for example, Saunders et al., Polyurethanes, Chemistry and Technology, Part I, pages 228–230, Interscience Publishers, New York, 1964; see also Burkus, J., Journal of Organic Chemistry, 26, pages 779–782, 1961. Representatives tertiary amine catalysts are disclosed in U.S. Pat. No. 5,563,180, whose disclosure relative thereto is incorporated herein by reference.

The molar ratio of the organic acid metal salt to the tertiary amine is chosen to minimize the foam shrinkage of the polyisocyanurate foams. The shrinkage experienced by foams subjected to low temperatures when low metal salt: tertiary amine molar ratios are employed can be significantly lessened by increasing this ratio. The appropriate ratio for any given metal salt/tertiary amine combination and foam-forming mixture can be readily determined through routine experimentation. Generally, the mole ratio of the organic acid metal salt to the tertiary amine in the inventive mixture is more than about 2:1, preferably more than about 5:1, and more preferably more than about 10:1. In a particularly desirable embodiment of the invention, the metal salt: tertiary amine mole ratio is about 100–20:1 (e.g., 24:1).

The catalyst or catalyst mixture is suitably employed in the form of an anhydrous solution in a carrier, which may be a polar hydroxylic organic solvent. The solvent is preferably a polyol, which desirably is an alkylene diol or polyalkylene ether diol, e.g., diethylene glycol (DEG). It is generally desirable to dissolve the catalyst components in about the minimum solvent needed to dissolve the metal-based component, which is the more difficultly dissolvable component.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from OSi Specialties, Inc. under the trade names Y-10222, Y-10764, Y-10816, Y-10884, L-5420 and L-5340, from the Dow Corning Corporation under the trade names DC-193 and DC-5315, and from Goldschmidt Chemical Corporation under the tradenames B-8408, B-8407, and B-8471. Other suitable surfactants are polyoxyalkylene/unsaturated diester reaction products, which are described in U.S. Pat. No. 4,365,024. It has been found that surfactants such as Y-10764 and Y-10816 can contribute significantly to an increase in foam insulation value. Generally, the surfactant comprises from about 0.05 to 10, and preferably from 0.1 to 6, weight percent of the foam-forming composition.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)phosphate and a mixture of B-chloropropyl phosphate esters with isomeric chloropropyl groups wherein the isopropyl structure predominates, dispersing agents, plasticizers, mold release agents, antioxidants, compatibility agents, and fillers and pigments (e.g., carbon black and silica). The use of such additives is well known to those skilled in the art.

The free rise process of the present invention is illustrated with reference to the apparatus shown in the drawings. The apparatus includes tanks 10, 11 and 12 for containing the foamable ingredients and additives such as surfactant, dye, blowing agent, etc. The tanks are charged with the foam-forming mixture in whatever manner is convenient and preferred for the given mixture. For instance, in the production of an isocyanurate foam, the foam-forming mixture can be divided into three liquid components, with the polyisocyanate, surfactant and all or a portion of the blowing agent in tank 10, the high acid polyester polyol and any remainder of the blowing agent in tank 11, and the catalyst in tank 12, each respectively connected to outlet lines 13, 14 and 15. The temperatures of the ingredients are controlled to insure satisfactory processing. The lines 13, 14 and 15 form the inlet to metering pumps 16, 17 and 18. The apparatus is also provided with a storage tank (not shown) for a frothing agent. This tank discharges into conduit 19 which opens at "T"-intersection 20 into line 13. A check valve 21 and ball valve 22 in conduit 19 ensure no backup of material toward the frothing agent storage tank. The frothing agent instead can be introduced in the same way into line 14 or both lines 13 and 14. The pumps 16, 17 and 18 discharge respectively through lines 23, 24 and 25. Lines 24 and 25 comprise branches which open into line 26, and lines 23 and 26 are in turn respectively connected to flexible lines 27 and 28. The flexible lines 27 and 28 discharge to mixing head 29.

The facing substrates for the foam of the invention may be composed of material which is flexible or rigid. Rigid facing materials can suitably be in the form of discrete sheets which are fed onto the production line in abutment. More conveniently, the facers are flexible material which is in the form of continuous or semicontinuous sheets fed from rolls. A wide variety of materials are employable as the facers. For example, the carrier substrate on the line can be a rigid or flexible material, such as perlite board, gypsum board, fiberboard, a metal sheet such as steel or aluminum, plywood, paper, paperboard, plastic foils, asphalt-saturated felt, a fiber glass sheet, an asphalt fiber glass sheet, etc., while the covering or upper facer is suitably a flexible material, such as asphalt-saturated felt, an asphalt fiber glass sheet, a fiber glass sheet, paper, paperboard, a metal or plastic foil, etc. The facers may be made from combinations of these materials.

Figure 2:
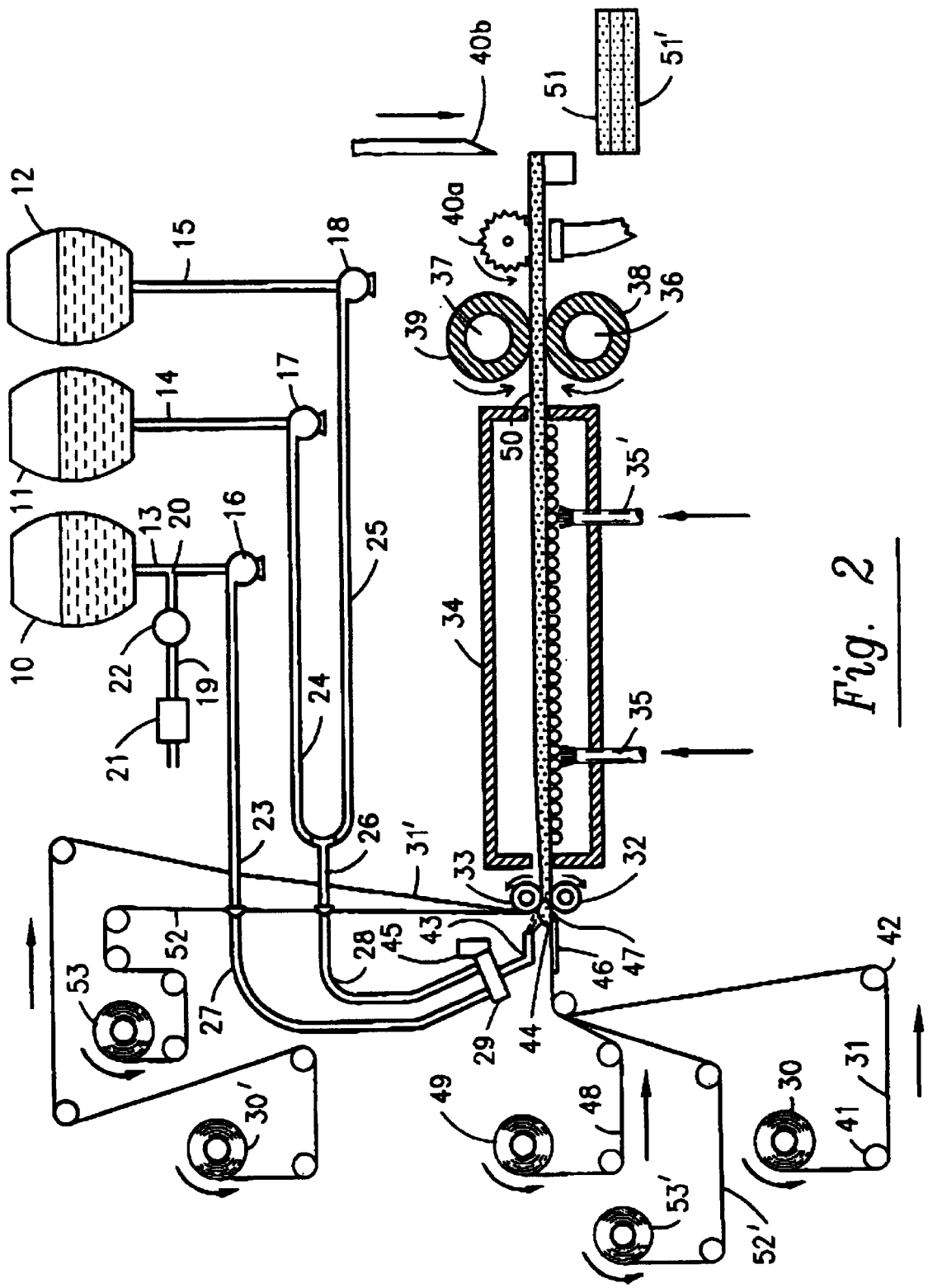
FIG. 2 is a schematic elevation of the apparatus of FIG. 1 showing additional fibrous webs being fed to the nip roll in accordance with the free-rise process of the invention.

As shown in FIGS. 1 and 2, the apparatus is provided with flexible facing materials or sheets fed from supply rolls, i.e., a roll 30 of lower facing material 31, and a roll 30' of upper facing material 31'. Where only a lower facing material is used, the upper facing material can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

As an example of the operation, the speeds of the pumps 16, 17 and 18 are adjusted to give the desired ratios of the ingredients contained in the tanks 10, 11 and 12, whereupon these ingredients pass respectively into lines 13, 14 and 15. When a froth-foaming process is conducted, the frothing agent is injected into line 13 upstream of metering pump 16. The ingredients pass through lines 23, 24 and 25, as well as lines 26, 27 and 28, whereupon they are mixed in the mixing head 29 and deposited therefrom. By virtue of rotation of the pull rolls 36 and 37, the lower facing material is pulled from the roll 30, whereas the upper facing material is pulled from the roll 30'. The facing material passes over idler rollers such as idler rollers 41 and 42 and is directed to the nip between the rotating metering rolls 32 and 33.

Various application devices, both stationary and moving, may be employed in depositing the chemicals. Even distribution of the foamable mix over the surface of the sheet material can be achieved by dispensing the chemicals from applicators having one or more delivery heads. In one preferred embodiment, applicator 43 comprises a nozzle which is reciprocated transversely of the sheet 31 to supply a stream of a liquid foamable mixture 44 uniformly thereacross. The back and forth movement of the mixing head and applicator is caused by a reciprocating means 45. In another preferred embodiment involving the deposition of froth chemicals, the mixing head 29 deposits the foamable chemicals through an applicator capable of laying down a wide band of froth on lower sheet 31. Advantageously, the applicator can be oscillated transversely a short distance to either side of a central point above sheet 31.

As shown in the drawings, the start or upstream end of the production line beneficially includes a smooth-topped platform or bed 46 which extends from upstream of the deposition point of the foamable mixture to a point upstream of and adjacent the constricting nip 47 between closely spaced parallel rollers 32 and 33. Lower sheet 31 moves downstream in a horizontal plane along the upper surface of bed plate 46 positioned as illustrated in the drawing. Bed plate 46 is adjustably mounted so that it can be inclined from the horizontal to elevate its downstream transverse edge (adjacent nip 47) above its upstream transverse edge. An improved control of the foam chemical bank has been achieved by thus tilting the conveying sheet 31 so that it and foamable chemicals thereon advance with an upward slope upstream of the nip-defining rollers.

Immediately downstream of the laydown point of the foamable chemicals, upper facing sheet 31' is brought into contact with the top surface of the chemicals. As illustrated in FIGS. 1 and 2, this contact is suitably effected by passing upper sheet 31' around roller 33 and through nip 47. In another favorable embodiment of the invention, the foamable mixture can be dispensed through applicator 43 onto the exposed surface of the sheet 31' as the latter passes around roller 33. In any event, between cylindrical rollers 32 and 33 the upper and lower facing sheets are brought together in surface-to-surface opposition relative to each other, with the foamable mixture sandwiched in between. As the facing sheets are brought into closely spaced adjacency between rollers 32 and 33, the constriction at nip or gap 47 causes a rolling bank of foamable mixture to build up, whereby there is a surplus or backlog of material available to pass through the nip of the rolls. One or both of rollers 32 and 33 are advantageously vertically shiftable for control of the thickness of the facers and foamable mixture passing through the nip.

The foam products of the invention can contain various reinforcement materials. As shown in FIG. 1, a reinforcing web 48 can be fed into the apparatus. One or more of the reinforcing webs may be used. The reinforcing web(s) may be introduced below the foamable chemicals, as in FIG. 1, above the chemicals, or both below and above them. Fiberglass fibers constitute a preferred web material. For example, in a preferred embodiment the reinforcing web will be the type of expandable glass mat used in producing the structural laminate of U.S. Pat. No. 4,028,158, i.e., a thin mat of long, generally straight glass fibers. By generally following the method of foam reinforcement described in Example 1 of U.S. Pat. No. 4,028,158 and utilizing a foam-forming mixture having the consistency of the liquid foamable mixture of this example, the glass mat becomes distributed within the foam core. In accordance with this embodiment, a thin mat 48 of glass fibers is fed from roll 49 toward the nip between the two rotating metering rolls 32 and 33. By virtue of rotation of the pull rolls 36 and 37, reinforcing mat 48 is pulled from its roll, through the nip of the metering rolls and downstream to form an expanded reinforcement material in the resulting structural laminate.

When the foam-forming mixture deposited on the underlying substrate during the process is in the form of a froth, an included reinforcing web, such as the thin glass mat of U.S. Pat. No. 4,028,158, will be pushed under the influence of the expanding froth to a position adjacent and interior to its associated facing sheet. In this way, a reinforcing web(s) can be placed interior to the lower or upper facing sheet or to both, as described in U.S. Pat. No. 4,572,865, the disclosure of which patent with respect to such reinforced structural laminates is hereby incorporated by reference.

The introduction of multiple reinforcement materials, which may involve 2 or more fibrous webs, is illustrated in FIG. 2 of the drawings. FIG. 2 shows three such materials, upper material 52 and lower materials 52' and 48, being fed toward the nip of the rolls, although in certain embodiments the upper material and only one lower material are employed. Included among the many types of fibrous webs which may be used in such multiple arrangements is the above-described expandable glass mat of U.S. Pat. No. 4,028,158. Another reinforcement material which may be incorporated in the foams of the invention is the penetrable fibrous web or scrim disclosed in U.S. application Ser. No. 08/801,074, filed Feb. 14, 1997, whose teachings with respect to such fibrous material are incorporated herein by reference. The foam product may be reinforced solely by webs of one or the other type or by a combination of the two. For example, the three reinforcing webs shown in FIG. 2 may consist of an expandable glass mat 48 of U.S. Pat. No. 4,028,158 and two penetrable webs of the just-mentioned patent application, an upper web 52 fed from supply roll 53 and a lower web 52' fed from supply roll 53'. Each penetrable web is fed through nip 47 just to the inside of its adjacent outer facing sheet.

The nip or gap 47 formed between the rolls 32 and 33 is accurately adjustable so as to insure contact of the foamable mixture with the facing sheets and any reinforcing material and cause the desired uniform distribution of the mixture across the width of the sheets. Rolls 32 and 33 thus serve as a device to meter the amount of chemicals being passed downstream for formation of the desired board thickness. One or both of the metering rolls may be profiled in a known manner to locally vary the thickness of nip 47, e.g., by providing a reduced gap in the center to attain a concomitant reduction in the center of the foam core. Another way to vary the shape of the metering gap is by controlling the temperature of one or both of the metering rolls as disclosed in U.S. application Ser. No. 08/752,104, filed Nov. 20, 1996, which is incorporated herein by reference.

Also, the intervening space between the rolls can be varied by movement of one or both of the rolls. For this purpose, upper roll 33 is suitably mounted on an adjustable support which permits the distance between its axis and the axis of lower metering roll 32 to be varied so that the nip between the rolls can be adjusted from a wide gap to almost a zero setting. This arrangement provides a high degree of control of the final thickness in the resulting foam board, with the foamable mixture being allowed to expand thereafter substantially freely to develop its natural rise profile. The metering rolls thus serve as a means for bringing the facing sheets into spaced conjunction, and for distributing the foamable mixture therebetween, as well as performing a final metering operation, supplementing the initial rough metering afforded by applicator 43.

After the faced foam-forming mixture goes between the nip of the two rolls 32 and 33, it passes into oven 34 and on along the generally horizontally extending production line, as shown in FIGS. 1 and 2. Oven 34 provides an expansion zone for the foam-forming mixture (e.g., a polyurethane or polyisocyanurate foam-forming mix). By varying the temperature of hot air from vents 35 and 35', the temperature within the oven 34 is maintained within the desired limits of 100° F. to 300° F., and preferably 175° F. to 250° F. The foam, under the influence of the heat added to the oven, cures to form faced foam plastic 50. The product 50 then leaves the oven 34, passes between the pull rolls 36 and 37, and is cut by side edge and length cutting means 40a and 40b into finite lengths, thereby forming discrete panels 51 of the product.

The present invention is further illustrated by the following examples in which all parts and percentages are by weight unless otherwise indicated.

EXAMPLE 1

This example illustrates, by reference to FIG. 2 of the drawings, a free-rise process for the production of insulating foam boards with the use of high acid polyester polyols of the invention.

The foam boards were prepared from the ingredients and quantities thereof shown in the following Table 1. For each of Foam Boards A–F, the A-component was charged to tank 10, the B-component to tank 11 and the C-component to tank 12 and aluminum foil facings 31, 31' were fed from supply rolls 30, 31'. Also for each board, an upper expandable glass fiber mat 52, weighing 2 g/ft$^2$, was fed from supply roll 53 and a lower expandable glass fiber mat 48, weighing 5.6 g/ft$^2$ for foam boards A, B, C, D and F and 7.0 g/ft$^2$ for foam board E, was fed from supply roll 49.

In the production, components A, B and C were brought together in a high pressure impingement foam head 29 in the proportions shown in Table 1. The top and bottom facings and glass mats were fed toward the nip of metering rolls 32 and 33. The foam forming mixture was deposited onto the lower glass fiber mat and metered between the nip rolls to establish the final product thickness. The composite proceeded through oven 34 to yield 3 inch thick foam boards of the invention.

The properties shown in Table 1 reveal that foam boards having overall good properties, including a superior cold temperature shrinkage resistance, can be obtained by using the high acid polyester polyols of the invention even though the foams were blown wholly by the alternative blowing agent HCFC-141b.

TABLE 1

PRODUCTION OF POLYISOCYANURATE FOAM BOARDS

| | FOAM BOARDS | | | | | |
|---|---|---|---|---|---|---|
| | A | B | C | D | E | F |
| INGREDIENTS (pts. by wt.) | | | | | | |
| A-Component | | | | | | |
| Mondur MR-200[1] | 222.9 | 222.9 | 222.9 | 222.9 | 222.9 | 222.9 |
| HCFC-141b | 29.5 | 29.5 | 29.5 | 29.5 | 29.5 | 29.5 |

TABLE 1-continued

PRODUCTION OF POLYISOCYANURATE FOAM BOARDS

| | FOAM BOARDS | | | | | |
|---|---|---|---|---|---|---|
| | A | B | C | D | E | F |
| Silicone surfactant | 2.2 | 2.2 | 2.2 | 2.2 | 2.2 | 2.2 |
| B-Component | | | | | | |
| Polyester Polyol 1[2] | 76.6 | 76.6 | — | — | — | — |
| Polyester Polyol 2[3] | | | 76.8 | 76.8 | 76.8 | 76.8 |
| HCFC-141b | 14.0 | 14.0 | 14.0 | 14.0 | 14.0 | 14.0 |
| C-Component | | | | | | |
| Catalyst[4] | 5.3 | 5.3 | 4.8 | 4.8 | 5.3 | 5.3 |
| BOARD PROPERTIES | | | | | | |
| Cream/Firm (sec) | 18/38 | 18/38 | 20/42 | 20/42 | 19/27 | 17/27 |
| Core Density (pcf) | 1.97 | 1.86 | 1.82 | 1.73 | 2.00 | 1.97 |
| k-factor (Initial) | 0.128 | 0.129 | 0.132 | 0.133 | 0.124 | 0.125 |
| Compressive Strength (psi) | 28 | 24 | 25 | — | 36 | 34 |
| Dim. Stability (%) 158° F./95% RH $\frac{(M+T)}{2}$ | — | 0.27 | 0.36 | — | 0.32 | 0.41 |
| Cold Lineal Chg.[5] | | | | | | |
| % length | −0.20 | −0.16 | −0.13 | −0.20 | −0.06 | −0.07 |
| % width | −1.08 | −1.21 | −1.50 | −1.52 | −0.52 | −0.70 |
| Recov. Lineal Chg.[6] | | | | | | |
| % length | −0.07 | −0.03 | −0.03 | −0.03 | 0.00 | 0.00 |
| % width | −0.43 | −0.65 | −0.74 | 0.70 | −0.13 | −0.30 |

[1] Mondur MR-200 = polymethylene polyphenyl isocyanate having an equivalent weight of 138, an acidity of 0.02% HCl, and a viscosity of 2,000 centipoises at 25° C. (supplied by Bayer Corporation).
[2] Polyester Polyol 1 = aromatic polyester polyol having an equivalent weight of 236, a viscosity of 3,333 cps at 25° C., and an acid number of 1.8.
[3] Polyester Polyol 2 = aromatic polyester polyol having an equivalent weight of 235, a viscosity of 2,600 cps at 25° C., and an acid number of 2.2.
[4] Catalyst = mixture of 48.50% potassium octoate (70% in DEG), 1.50% pentamethyldiethylenetriamine, and 50.00% polyethylene glycol.
[5] Foam board subjected to −20° F. for 24 hours and immediately tested.
[6] Foam board subjected to −20° F. for 24 hours, allowed to recover to ambient temperature and then tested.

EXAMPLE 2

This example illustrates, by reference to FIG. 2 of the drawings, the acidification of a polyester polyol and use of the acidified polyol in the free-rise production of insulating foam boards.

(A) ACIDIFICATION OF POLYESTER POLYOL 15,261 lbs. of Terate 2541, a commercially available polyester polyol having an acid number of 0.7, and 3,739 lbs. of the blowing agent HCFC-141b were charged to tank 11. 76.3 lbs. of butyl acid phosphate were next added to the tank and the ingredients were agitated at 21° C. for 1.5 hours to yield a mixture of the blowing agent and polyester polyol, whose acid number was determined to be 1.80.

(B) PRODUCTION OF FOAM BOARDS

The foam boards were prepared from the ingredients and quantities thereof shown in the following Table 2. For each of Foam Boards G–I, the A-, B- and C- components were fed to tanks 10, 11 and 12, respectively. Aluminum foil facings 31, 31' and an expandable glass fiber mat 48, weighing 7.0 g/ft², were used in making each board. Also, an upper glass fiber scrim 52 was fed just to the inside of aluminum facing 31' in the production of Foam Boards G and I, and an upper glass fiber scrim 52 and a lower glass fiber scrim 52' were fed just to the inside of aluminum facings 31' and 31, respectively, in the production of Foam Board H. Each of the glass fiber scrims had a weight of 2.9 g/ft² and a 5×5 mesh construction.

In each production, the A-, B- and C-components were deposited onto the glass fiber mat 48 and each faced and glass fiber reinforced composite was conveyed between the nip rolls to yield a final product having a thickness of 4¼ inches. The results shown in Table 2 reveal that the inventive foam boards have excellent properties, including a superior resistance to shrinkage upon exposure to a low temperature.

TABLE 2

PRODUCTION OF POLYISOCYANURATE FOAM BOARDS

| | FOAM BOARDS | | |
|---|---|---|---|
| | G | H | I |
| INGREDIENTS (pts. by wt.) | | | |
| A-Component | | | |
| Mondur MR-200[1] | 222.9 | 222.9 | 222.9 |
| HCFC-141b | 27.1 | 27.1 | 27.1 |
| Silicone surfactant | 2.2 | 2.2 | 2.2 |
| B-Component | | | |
| Acidified Polyester Polyol[2] | 74.2 | 74.2 | 74.2 |
| HCFC-141b | 18.2 | 18.2 | 18.2 |
| Acidifier[3] | 0.4 | 0.4 | 0.4 |
| C-Component | | | |
| Catalyst 1[4] | 6.3 | 6.3 | |
| Catalyst 2[5] | | | 5.3 |
| BOARD PROPERTIES | | | |
| Cream/Firm (sec) | 20/44 | 20/43 | 20/40 |
| Core Density (pcf) | 1.92 | 1.92 | 1.87 |
| Compressive Strength (psi) | 32 | 28 | 29 |
| Cold Lineal Chg.[6] | | | |
| % length | −0.13 | −0.13 | −0.78 |
| % width | −2.34 | −1.42 | −3.38 |
| Recov. Lineal Chg.[7] | | | |
| % length | −0.13 | −0.00 | −0.39 |
| % width | −0.78 | −0.52 | −1.82 |

[1]Of Example 1
[2]Acidified Polyester Polyol = aromatic polyester polyol having an equivalent weight of 236, and an acid number of 1.80.
[3]Acidifier = butyl acid phosphate.
[4]Catalyst 1 = mixture of 64.72% potassium octoate (70% in DEG), 0.83% 2,4,6-tris[dimethylaminomethyl]phenol, and 34.44% polyethylene glycol.
[5]Catalyst 2 = mixture of 42.88% potassium octoate (70% in DEG), 4.93% 2,4,6-tris[dimethylaminomethyl]phenol, 12.04% Dabco TMR-4 of Air Products and Chemicals, and 40.15% polyethylene glycol.
[6]Foam board subjected to −20° F. for 24 hours and immediately tested.
[7]Foam board subjected to −20° F. for 24 hours, allowed to recover to ambient temperature and then tested.

We claim:

1. A closed cell, rigid polymer foam which comprises the reaction product prepared by
   (a) continuously conveying a carrier along a production line,
   (b) supplying on top of the carrier a foam-forming mixture comprising a polyisocyanate, an isocyanate-reactive component, a catalyst and a hydrogen-containing blowing agent or a mixture of a hydrogen-containing blowing agent and at least one co-blowing agent, the isocyanate-reactive component comprising (i) a high acid polyester polyol having an acid number greater than 1, or (ii) a mixture of the high acid polyester polyol and at least one other isocyanate-reactive compound,
   (c) passing the carrier and mixture between two spaced opposed constricting members which lie one above the other and form therebetween a metering gap for distributing the mixture over the carrier and
   (d) allowing the mixture after passing through the gap to freely expand to form a plastic foam, wherein the acid number of the high acid polyester polyol and the amount thereof in the mixture are sufficiently high to result in an improved resistance to cold temperature shrinkage vis-à-vis that of a comparable foam having the same density and prepared from the same foam-forming mixture except that the high acid polyester polyol is replaced by a conventional polyester polyol having the same equivalent weight but a lower acid number.

2. The foam of claim 1 wherein each constricting member comprises a horizontal rotatable roll and one or both of the rolls are vertically shiftable for control of the thickness of the gap.

3. The foam of claim 1 wherein the foam-forming mixture comprises a mixture for forming a polymer foam selected from the group consisting of polyurethane and polyisocyanurate foams.

4. The foam of claim 3 wherein the foam-forming mixture includes at least one additive selected from the group consisting of viscosity reducers, surfactants, flame retardants, dispersing agents, plasticizers, mold-release agents, antioxidants, compatibility agents, fillers and pigments.

5. The foam of claim 3 wherein the high acid polyester polyol is the reaction product of a polycarboxylic acid component and an aliphatic diol of the formula

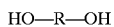

HO—R—OH wherein R is a divalent radical selected from the group consisting of:
   (a) alkylene radicals containing from 2 through 6 carbon atoms, and
   (b) radicals of the formula:

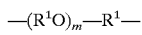

—(R¹O)$_m$—R¹— wherein R¹ is an alkylene radical containing from 2 through 6 carbon atoms, and m is an integer of from 1 through 4, and
   (c) mixtures thereof.

6. The foam of claim 5 wherein the high acid polyester polyol is an aromatic compound.

7. The foam of claim 6 wherein the polycarboxylic acid component is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) tall oil fatty acids, (i) trimellitic anhydride, and j) combinations thereof.

8. The foam of claim 3 wherein the carrier comprises a lower facing sheet and an upper facing sheet is provided above the deposited mixture at a point upstream of the metering gap, whereby a composite sandwich of the upper and lower facing sheets with the deposited mixture therebetween is passed through the gap and on downstream along the production line.

9. The foam of claim 8 which includes the step of supplying at a point upstream of the metering gap at least one web of reinforcing material between the upper and lower facing sheets, whereby a composite sandwich of the upper and lower facing sheets with the deposited mixture and reinforcing material therebetween is passed through the metering gap and on downstream along the production line.

10. The foam of claim 8 wherein the foam-forming mixture comprises a mixture for forming a polyisocyanurate foam.

11. The foam of claim 10 which includes the step of supplying at a point upstream of the metering gap at least one web of reinforcing material between the upper and lower facing sheets, whereby a composite sandwich of the upper and lower facing sheets with the deposited mixture and reinforcing material therebetween is passed through the metering gap and on downstream along the production line.

12. The foam of claim 10 wherein the hydrogen-containing blowing agent is selected from the group consisting of 1,1-dichloro-1-fluoroethane, 1,1-dichloro-2,2,2-trifluoroethane, monochlorodifluoromethane, 1-chloro-1,1-difluoroethane, 1,1,1,3,3,3-hexafluoropropane, 2,2,4,4-tetrafluorobutane, 1,1,1,3,3,3- hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, pentafluoroethane, methyl-1,1,1-trifluoroethylether, difluoromethyl-1,1,1-trifluoroethylether, n-pentane, isopentane, cyclopentane, and mixtures thereof.

13. The foam of claim 10 wherein the catalyst comprises (a) an organic acid metal salt and (b) optionally a tertiary amine, wherein the mole ratio of the organic acid metal salt:tertiary amine is a value greater than about 2:1.

14. The foam of claim 13 wherein the organic acid metal salt is potassium octoate and the mole ratio of potassium octoate:tertiary amine is a value greater than about 10:1.

15. The foam of claim 10 wherein the high acid polyester polyol is an aromatic compound comprising the reaction product of a polycarboxylic acid component and an aliphatic diol of the formula

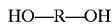

wherein R is a divalent radical selected from the group consisting of:

(a) alkylene radicals containing from 2 through 6 carbon atoms, and (b) radicals of the formula:

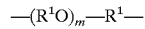

wherein $R^1$ is an alkylene radical containing from 2 through 6 carbon atoms, and m is an integer of from 1 through 4, and (c) mixtures thereof.

16. The foam of claim 15 wherein the polycarboxylic acid component is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) tall oil fatty acids, (i) trimellitic anhydride, and (j) combinations thereof.

17. The foam of claim 16 wherein the thickness of the gap is preset to produce a plastic foam product having an average thickness of about 2–4½ inches, the foam-forming mixture includes a surfactant, and the catalyst comprises (a) an organic acid metal salt and (b) a tertiary amine, wherein the mole ratio of the organic acid metal salt:tertiary amine is a value greater than about 10:1.

18. The foam of claim 17 wherein the organic acid metal salt is potassium octoate the mole ratio of potassium octoate::tertiary amine is a value greater than about 15:1.

* * * * *